(12) United States Patent
Manzo

(10) Patent No.: US 10,704,841 B2
(45) Date of Patent: Jul. 7, 2020

(54) MONOLITHIC BICONTINUOUS LABYRINTH STRUCTURES AND METHODS FOR THEIR MANUFACTURE

(71) Applicant: Titan Tensor LLC, Tempe, AZ (US)

(72) Inventor: Joseph T. Manzo, Tempe, AZ (US)

(73) Assignee: Titan Tensor LLC, Tempe, AZ (US)

( * ) Notice: Subject to any disclaimer, the term of this patent is extended or adjusted under 35 U.S.C. 154(b) by 135 days.

(21) Appl. No.: 15/806,839

(22) Filed: Nov. 8, 2017

(65) Prior Publication Data

US 2018/0187984 A1 Jul. 5, 2018

Related U.S. Application Data

(60) Provisional application No. 62/441,784, filed on Jan. 3, 2017.

(51) Int. Cl.

| F28F 7/02 | (2006.01) |
|---|---|
| B23K 15/00 | (2006.01) |
| B23K 26/342 | (2014.01) |
| F28F 27/00 | (2006.01) |
| F28F 13/12 | (2006.01) |

(Continued)

(52) U.S. Cl.
CPC ............. *F28F 7/02* (2013.01); *B22F 3/1055* (2013.01); *B22F 3/1115* (2013.01); *B22F 5/10* (2013.01); *B23K 15/0086* (2013.01); *B23K 26/342* (2015.10); *B33Y 10/00* (2014.12); *B33Y 80/00* (2014.12); *F28F 13/12* (2013.01); *F28F 27/00* (2013.01); *B22F 2999/00* (2013.01); *F28F 2250/10* (2013.01); *F28F 2250/104* (2013.01);

(Continued)

(58) Field of Classification Search
CPC .. B22F 2999/00; B22F 3/1055; B22F 3/1115; B22F 5/10; B23K 15/0086; B23K 26/342; B33Y 10/00; B33Y 80/00; F28F 13/12; F28F 2250/10; F28F 2250/104; F28F 2250/106; F28F 2255/18; F28F 2260/02; F28F 27/00; F28F 7/02
See application file for complete search history.

(56) References Cited

U.S. PATENT DOCUMENTS

| 9,463,528 | B2 * | 10/2016 | Reichenbach | ....... B23K 26/083 |
| 2008/0149299 | A1 * | 6/2008 | Slaughter | .......... B22F 3/1055 |
| | | | | 165/10 |

(Continued)

OTHER PUBLICATIONS

Hyde and Ramsdell, "Polycontinuous Morphologies and Intehwovben Helical Networks," Europhysics Letters, 50 (2) pp. 135-141 (Apr. 2000).

(Continued)

*Primary Examiner* — Henry T Crenshaw
(74) *Attorney, Agent, or Firm* — Jennings Strouss & Salmon PLC; Michael K. Kelly; Daniel R. Pote

(57) ABSTRACT

A heat exchanger includes a core comprising a single piece continuous boundary having a first surface defining a first labyrinth, and an opposing second surface defining a second labyrinth; a first inlet manifold connected to the first labyrinth and configured to supply a first fluid to the first labyrinth; and a second inlet manifold connected to the second labyrinth and configured to supply a second fluid to the second labyrinth; wherein the core comprises a plurality of identical three dimensional unit cell structures replicated in three orthogonal spatial dimensions.

8 Claims, 16 Drawing Sheets

(51) Int. Cl.
*B22F 5/10* (2006.01)
*B33Y 10/00* (2015.01)
*B22F 3/11* (2006.01)
*B33Y 80/00* (2015.01)
*B22F 3/105* (2006.01)

(52) U.S. Cl.
CPC ..... *F28F 2250/106* (2013.01); *F28F 2255/18* (2013.01); *F28F 2260/02* (2013.01)

(56) References Cited

U.S. PATENT DOCUMENTS

| | | | | |
|---|---|---|---|---|
| 2009/0321045 | A1* | 12/2009 | Hernon | F28F 13/003 165/80.2 |
| 2010/0044320 | A1* | 2/2010 | Weber | B01J 14/005 210/749 |
| 2013/0058042 | A1* | 3/2013 | Salamon | H01L 23/3672 361/700 |
| 2014/0014493 | A1* | 1/2014 | Ryan | B01J 19/30 203/89 |
| 2014/0166137 | A1* | 6/2014 | Noishiki | B01J 19/00 137/602 |
| 2015/0014323 | A1* | 1/2015 | Loukus | F17C 1/00 220/564 |
| 2017/0030519 | A1* | 2/2017 | Kuczek | F17C 1/14 |
| 2017/0149083 | A1* | 5/2017 | Duoss | H01M 10/02 |
| 2017/0291372 | A1* | 10/2017 | Milshtein | B33Y 10/00 |
| 2018/0117533 | A1* | 5/2018 | Arafat | B01D 63/103 |

OTHER PUBLICATIONS

Gandy and Klinowski, "Exact Computation of the Triply Periodic Schwartz P Minimal Surface," Chemical Physics Letters 322 pp. 579-586 (Jun. 2000).

Gandy, Cvijovic, Mackay, and Klinowski, "Exact Computation of the Triply Periodic D ('Diamond') Minimal Surface," Chemical Physics Letters 314 pp. 543-551 (1999).

Lidin, Hyde, and Ninham, "Exact Construction of Periodic Minirnal Surfaces: the I-WP Surface and its Isometries," Le Journal De Physique No. 9 (May 1990).

Gandy and Klinowski, "Exact Computation of the Triply Periodic G ('Gyroid') Minimal Surface," Chemical Physics Letters 321 pp. 363-371 (May 2000).

* cited by examiner

MONOLITHIC BICONTINUOUS LABYRINTH STRUCTURES AND METHODS FOR THEIR MANUFACTURE

CROSS REFERENCE TO RELATED APPLICATION

The present application claims priority to and incorporates by reference the entirety of U.S. provisional application Ser. No. 62/441,784 filed Jan. 3, 2017 and entitled "Monolithic Bicontinuous Structure and Methods For Their Manufacture".

TECHNICAL FIELD

The present invention relates, generally, to monolithic bi-continuous core (MBC) structures and, more particularly, to additive manufacturing methods adapted for their fabrication.

BACKGROUND

Indirect contact heat exchangers seek to maximize the aggregate heat transfer surface area within the heat exchanger core boundary or volume. Presently known core designs typically employ a shell-in-tube, alternating plates and fins, or an alternating plate-plate configuration. However, these designs require extensive brazing and/or welding to isolate the respective fluid paths within the core, and to seal the interfaces between the core and the various inlet and outlet manifolds.

Recent advances in additive manufacturing (AM) technologies have enabled the cost efficient fabrication of complex structures. Conventional heat exchanger core designs typically include many 90 degree angles or other configurations which yield overhanging surfaces that are not well suited with AM processes.

Current heat exchanger core designs and manufacturing methods are thus limited due to their high fabrication and maintenance costs, coupled with low yields. The present disclosure proposes core designs and manufacturing methods which overcome these and other shortcomings of the prior art.

Various features and characteristics will also become apparent from the subsequent detailed description, taken in conjunction with the accompanying drawings and this background section.

BRIEF SUMMARY

The present invention provides a monolithic (e.g., single piece construction) core having a bi-continuous or ploy-continuous (e.g., two or more independent labyrinths) structure useful in heat exchange and other applications. The characteristic geometry of core configurations described herein, namely, a replicated unit cell, renders them efficiently manufacturable using additive manufacturing (AM) techniques.

Various core designs described herein leverage unit cell configurations which exhibit minimal or zero mean Gaussian curvature and, hence, are particularly attractive candidates for additive manufacturing. That is, unit cell configurations which exhibit minimal mean curvature are self-supporting and thus avoid overhangs and other geometric features which tend to be incompatible with AM techniques. At the same time, cores fabricated by periodic unit cell reproduction provide flexibility in designing core volumes to fit within a defined operating environment of virtually any contiguous shape, while enhancing heat transfer properties vis-a-vis traditional shell-in-tube and plate-and-fin designs. By using additive manufacturing methods described herein and otherwise known to the skilled artisan, the shortcomings associated with conventional brazed or welded joints may be mitigated or avoided entirely.

Various embodiments of the present invention involve heat transfer cores in the form of monolithic bi-continuous (MB) structures (or poly-continuous cores) comprising a single non-intersecting surface that creates two or more independent labyrinth volumes (flow channels). The geometry may be optimized by selecting an appropriate lattice parameter value (and other metrics) to achieve a desired hydraulic diameter, surface compactness, flow volume, heat transfer, pressure loss, and flow arrangements. The core geometry is created by periodically repeating a unit cell geometry of zero or near zero mean curvature in three orthogonal directions. The entrances and exits of the labyrinths located at the boundaries of the heat exchanger core may be selectively opened and closed to create fluid inlets and outlets for any desired flow arrangement.

Various other embodiments, aspects, and features are described in greater detail below.

BRIEF DESCRIPTION OF THE DRAWING FIGURES

DETAILED DESCRIPTION OF PREFERRED EXEMPLARY EMBODIMENTS

Figure 1:
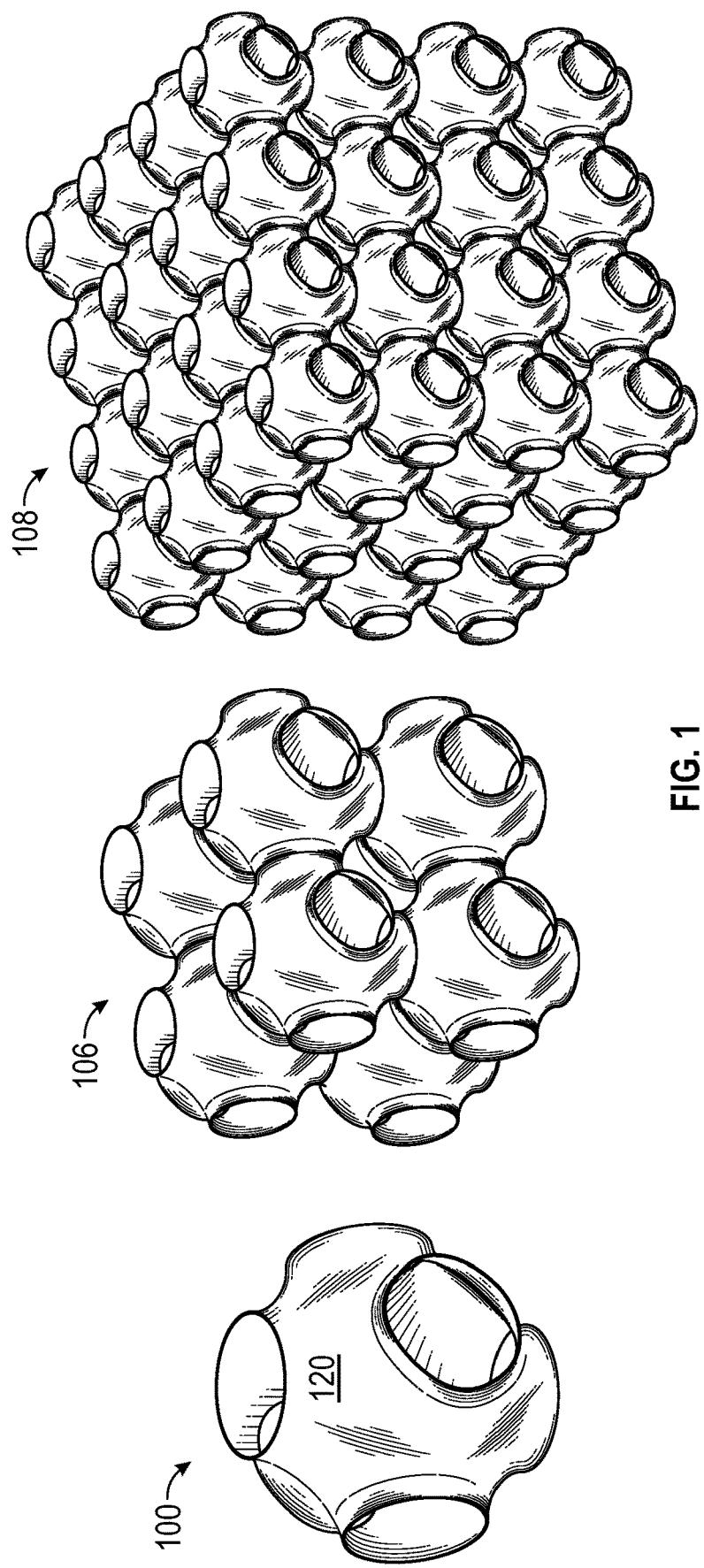
FIG. 1 is a perspective view of an exemplary unit cell, shown alone and periodically repeated to form three-dimensional monolithic bi-continuous (MB) core structures in accordance with various embodiments.

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to monolithic bi-continuous core structures and additive manufacturing (AM) methods for their fabrication. An important design consideration which enables AM fabrication of such cores involves the selection of an appropriate three-dimensional unit cell, and thereafter configuring the unit cell parameters to optimize thermal, material, and mechanical considerations in the context of a particular application (e.g., to manipulate the volume ratio between the two fluids). By periodically repeating a unit cell with minimal mean curvature, a continuous monolithic core forms two or more independent labyrinths, which may be fabricated using conventional AM techniques. In this regard, reference is made to the following papers, copies of which are attached hereto and hereby incorporated herein: i) Hyde and Ramsden, "Polycontinuous Morphologies and Interwovben Helical Networks," Europhysics Letters, 50 (2) Pages 135-141 (April 2000); ii) Gandy and Klinowski, "Exact Computation of the Triply Periodic Schwartz P Minimal Surface," Chemical Physics Letters 322 Pages 579-586 (June 2000); iii) Gandy, Cvijovic, Mackay, and Klinowski, "Exact Computation of the Triply Periodic D ('Diamond') Minimal Surface," Chemical Physics Letters 314 Pages 543-551 (1999); iv) Lidin, Hyde, and Ninham, "Exact Construction of Periodic Minimal Surfaces: the I-WP Surface and its Isometries," Le Journal De Physique No. 9 (May 1990); and v) Gandy and Klinowski, "Exact Computation of the Triply Periodic G ('Gyroid') Minimal Surface," Chemical Physics Letters 321 Pages 363-371 (May 2000).

In the context of the ensuing discussion the following terms generally have the following meanings:

Heat Exchanger: A device for transferring heat from one fluid or gaseous medium to another;

Labyrinth: A continuous independent volume or channel created by a core monolithic structure and hydraulically and/or pneumatically isolated from the other channel or channels;

Core: The labyrinth or intertwined channels of the heat transfer device in which the two (or more) fluids exchange thermal energy;

Inlet: The structure through which fluid enters a specified labyrinth;

Outlet: The structure through which fluid exits a specified labyrinth;

Frame: The frame provides the supporting interface between the core and mounting surfaces;

Unit Cell: The defining geometric feature which embodies the overall symmetry of the core and from which the core can be built up by extrapolation in three dimensions;

Manifold: The manifold refers to the structure used to direct fluid either into or out of an inlet or outlet; and Flow Arrangement: The location of inlets and outlets relative to the core.

In a preferred embodiment the core comprises a monolithic bi-continuous structure having a single surface defining two independent labyrinths. Any number of inlets and outlets may communicate with a corresponding manifold, depending on the physical arrangement of the operating space and required fluid flow considerations.

In accordance with various embodiments, the core of a heat/mass transfer device may be constructed as a single monolithic structure that creates two or more independent labyrinths. To achieve this, core geometry should be substantially devoid of self-intersections. The labyrinths are intertwining and allow for heat transfer between independent labyrinths as the fluids traverse the respective volumes. The core geometry allows for fluid inlets and outlets to be placed anywhere on the core surface. This allows for flexibility in flow arrangement and manifolding. Fluid mixing within an independent labyrinth or among multiple labyrinths may be achieved with appropriate manifolding.

In various embodiments, a monolithic bi-continuous core (MBC) (or monolithic poly-continuous core (MPC)) employs a unit cell periodically repeated in three orthogonal directions to fill the volume available for the core within the intended operating environment. MBC structures that are created by repeating a unit cell in this way exhibit a geometry with minimal or zero mean curvature, and thus may be conveniently manufactured using additive manufacturing processes. Creating a MBC in this manner allows for essentially the entire core geometry to function as a primary heat transfer surface. Since the core is created by periodically repeating a unit cell, hydraulic diameter and total labyrinth volume may be controlled by manipulating the lattice parameter of the unit cell, the thickness of the labyrinth wall, and the hydraulic length of the labyrinth. By using a non-uniform wall thickness in the unit cell, the ratio of the two labyrinth volumes may be controlled.

Referring now FIG. 1, a single exemplary unit cell 100 comprises a first (external) surface 102, and an oppositely disposed second (internal) surface. A two-by-two matrix 106 and a four-by-four matrix 108 may be constructed by periodically repeating and thereby extending (extrapolating) the unit cell 100 in three spatial dimensions.

Figure 2:
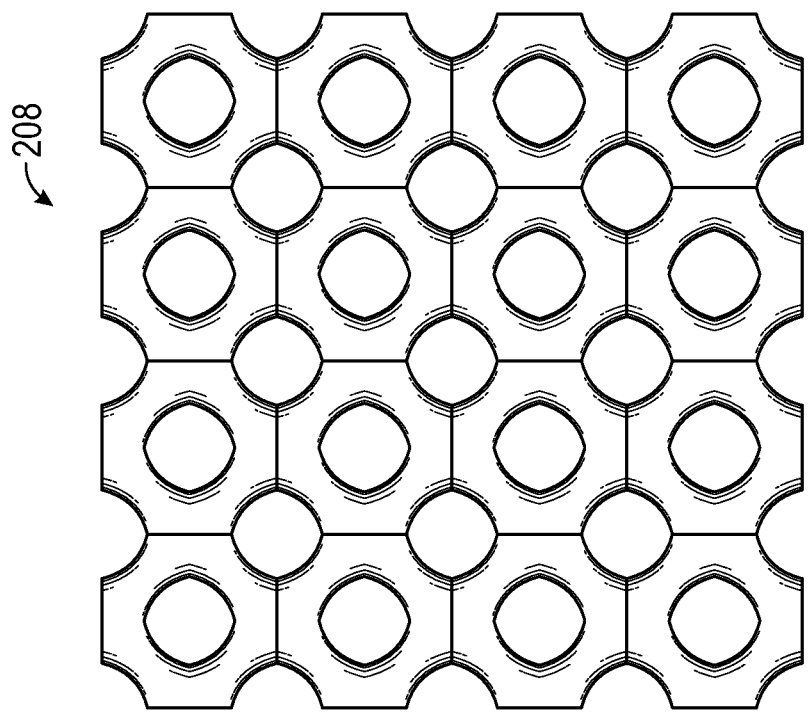
FIG. 2 is a front elevation view of the structures shown in FIG. 1 in accordance with various embodiments.
Figure 2:
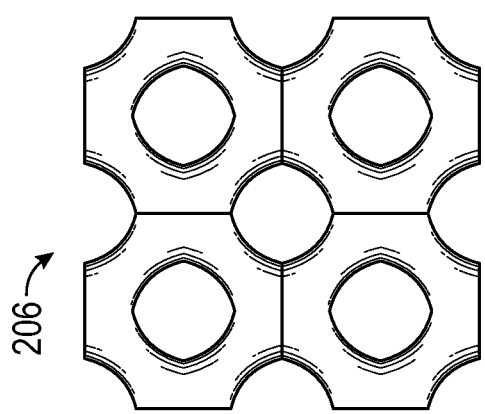
Figure 2:
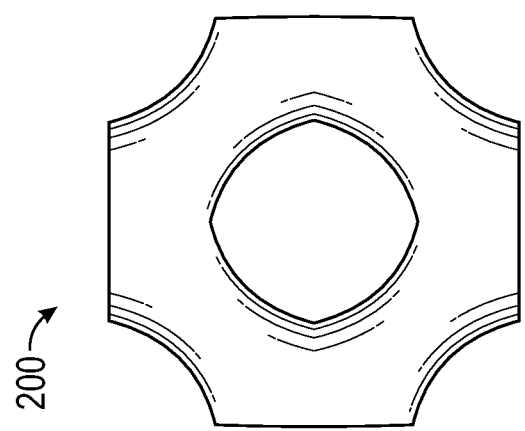

FIG. 2 is a front elevation view of the structures shown in FIG. 1, illustrating a single unit cell 200, a continuous four unit cell structure 206 extended in two dimensions, and a continuous sixteen unit cell structure 208 extended in two dimensions.

Figure 3:
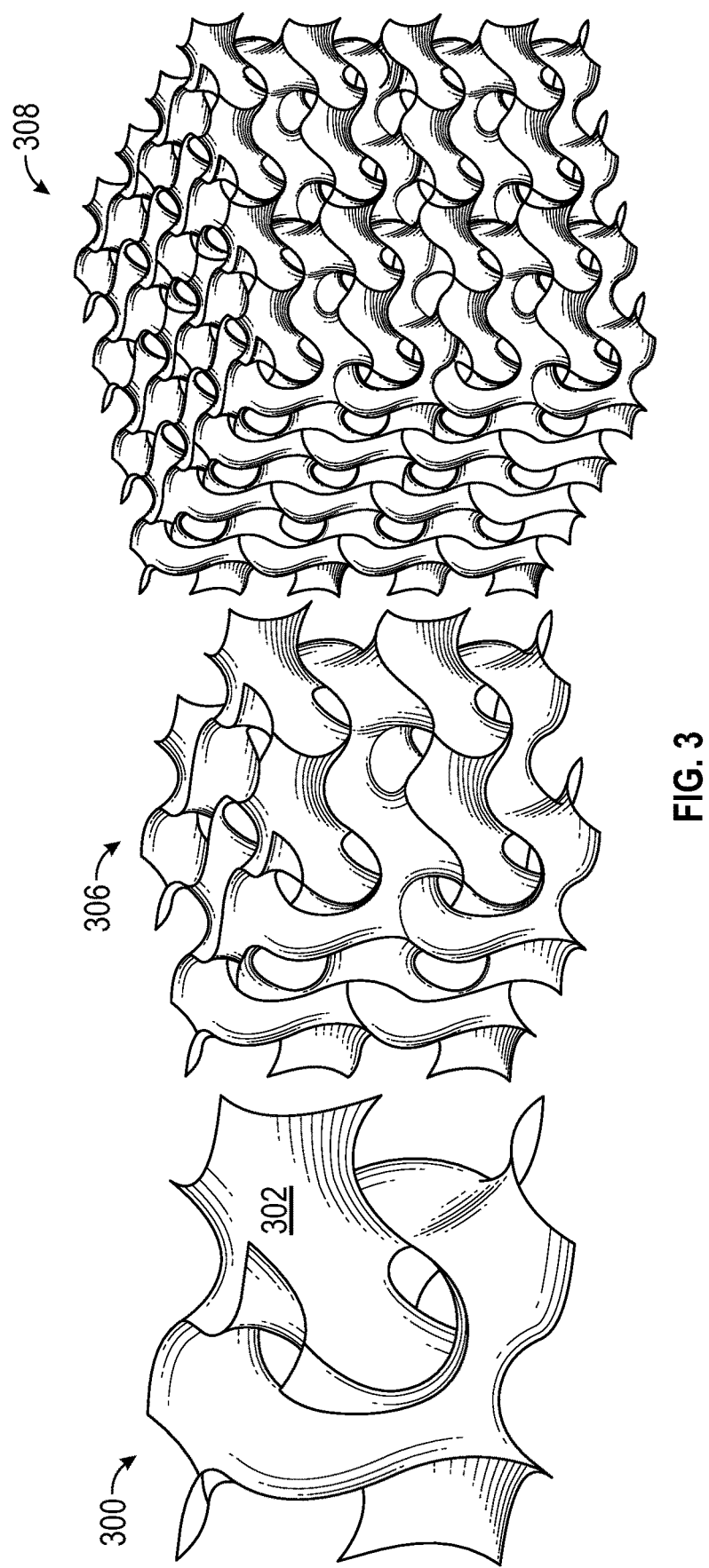
FIG. 3 is a perspective view of an alternative exemplary unit cell, shown alone and periodically repeated to form three-dimensional MB core structures in accordance with various embodiments.

FIG. 3 is a perspective view of an alternative exemplary unit cell 300 having a first surface 302 and an opposite second surface, shown differently textured, shaded, and or colored to facilitate three dimensional visualization. A two-by-two matrix 306 and a four-by-four matrix 308 may be constructed by contiguously extending the unit cell 300 in three orthogonal spatial dimensions.

Figure 4:
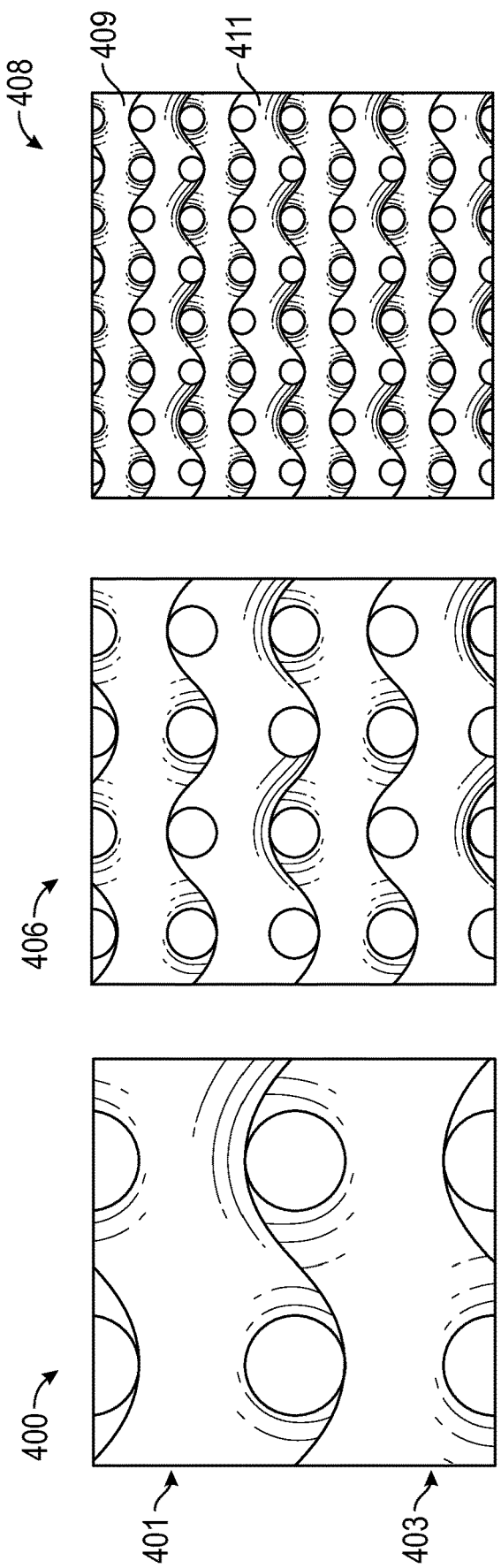
FIG. 4 is a front elevation view of the structures shown in FIG. 3 in accordance with various embodiments.

FIG. 4 is a front elevation view of the structures shown in FIG. 3, illustrating a single unit cell 400, a continuous four unit cell structure 406 extended in two dimensions, and a continuous sixteen unit cell structure 408 extended in two dimensions. A first surface of the unit cell 400 defines a first labyrinth portion 401, and an opposing surface of the unit cell defines a second labyrinth portion 403. Contiguous periodic extension of the unit cells yields a first substantially sinusoidal labyrinth or channel 409, and a second substantially sinusoidal labyrinth 411 which is hydraulically isolated from the first labyrinth.

Figure 5:
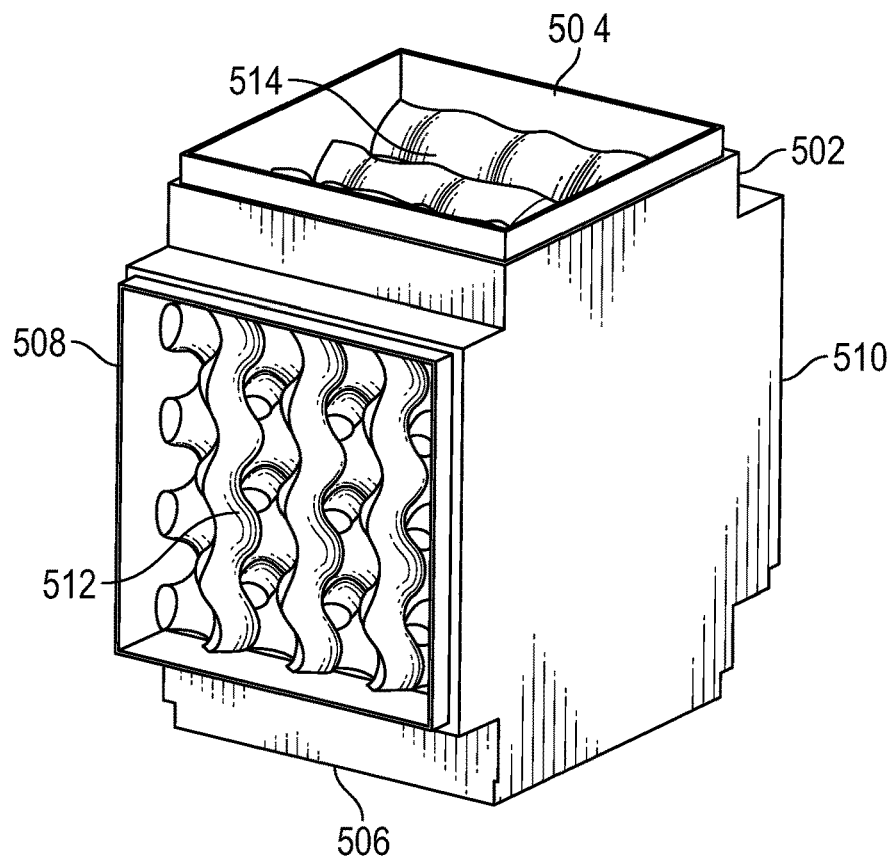
FIG. 5 is a perspective view of an exemplary MBC integrated with a frame in a cross flow configuration, illustrating finning configured to direct each fluid into separate labyrinths in accordance with various embodiments.

FIG. 5 depicts a MBC integrated with an external frame or housing 502 in a cross flow configuration comprising a first fluid inlet shroud 504, a first fluid discharge shroud 506, a second fluid inlet shroud 508, and a second fluid discharge shroud 510. The fin structures 512 direct incoming fluid into a first labyrinth, and fin structures 514 direct incoming fluid into a second labyrinth using respective manifolds which may be adapted to mate with the fins, as appropriate.

Figure 6:
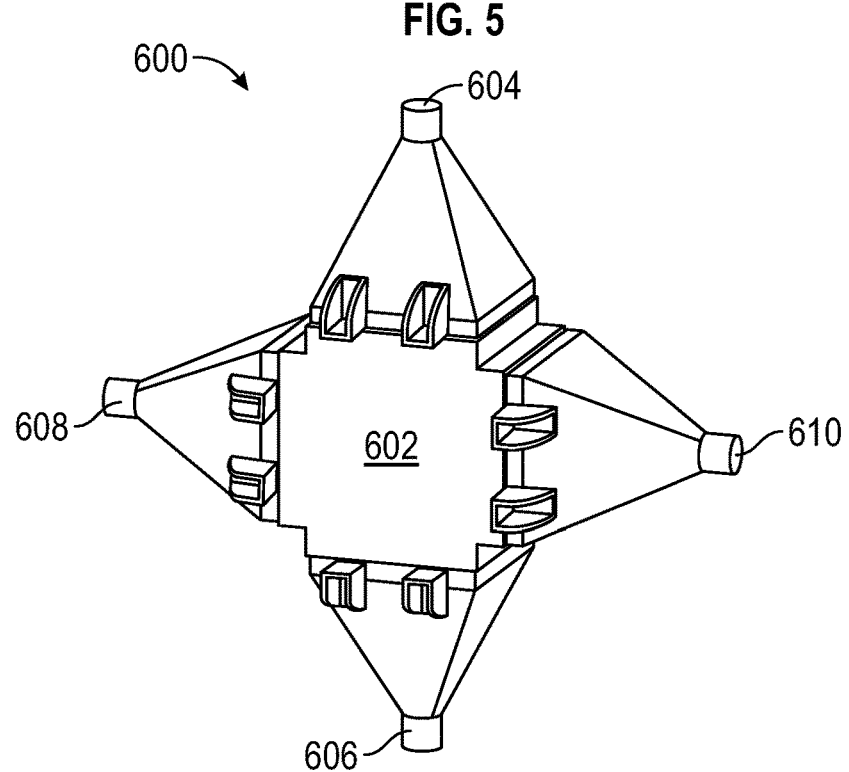
FIG. 6 is a perspective view of MB core having an integral frame structure equipped with inlet and outlet manifolds for respective flow paths (labyrinths) in accordance with various embodiments.

FIG. 6 is a heat exchanger assembly 600 including an MB core (not shown) having an integral frame 602 equipped with a first inlet manifold 604, a first outlet manifold 606, a second inlet manifold 608, and a second outlet manifold 610.

Figure 7:
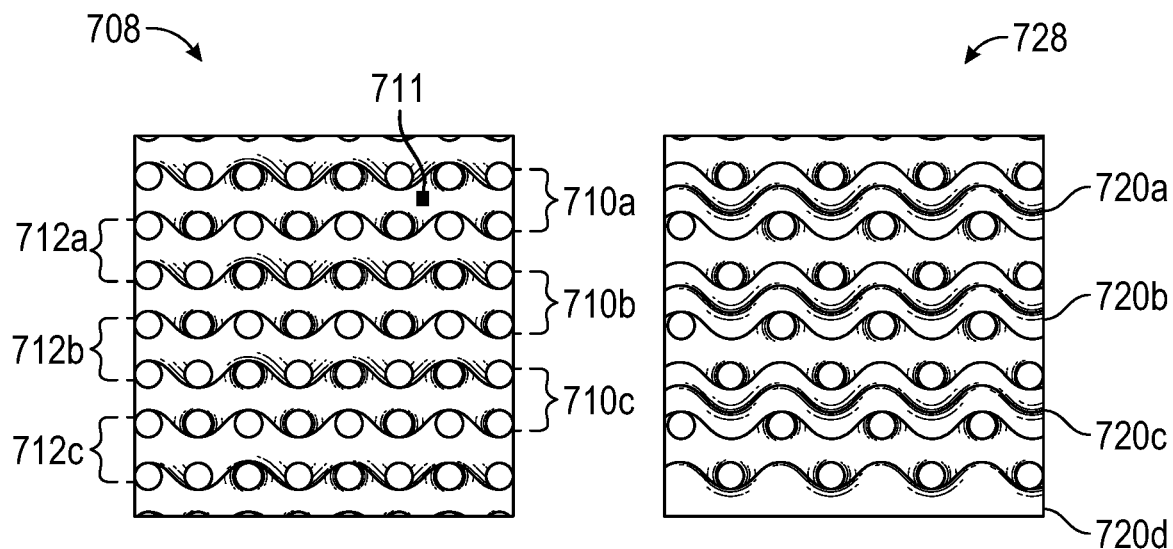
FIG. 7 is a front elevation view of an exemplary unfinned MB core (left side of the figure) and a finned MB core (right side of the figure) in accordance with various embodiments.

FIG. 7 is a front elevation view of two embodiments of an exemplary MB core; one without and one with finning. More particularly, an unfinned core 708 (generally analogous to core 408 in FIG. 4) defines: i) a first labyrinth comprising channel sections 710(a)-710(c); and ii) a second labyrinth comprising channel sections 712(a)-712(c). As described above, every point on the surface of the first labyrinth hydraulically communicates with every other point on the first labyrinth, and every point on the surface of the second labyrinth hydraulically communicates with every other point on the second labyrinth, with the two labyrinths being hydraulically isolated from each other within the core interior. However, both labyrinths are open at the outside boundaries of the core. Thus, fluid applied indiscriminately to the outside core boundary would enter both labyrinths simultaneously, which may be useful when mixing two or more fluids together. In contrast, indirect contact heat exchanger applications typically require some type of supplemental boundary structure for selectively directing fluid into only one of the labyrinths.

With continued reference to FIG. 7, a finned core 728 includes fins 729(a)-729(d) which prevent fluid from entering (and thereby "close off") the channel sections 710(a)-710(c) corresponding to the first labyrinth, while permitting fluid to selectively enter only the channel sections 712(a)-712(c) corresponding to the second labyrinth. In addition, the size, shape, location, and orientation of the finning may be configured to cooperate with a mating manifold to thereby cause fluid to enter the desired labyrinth.

Figure 8:
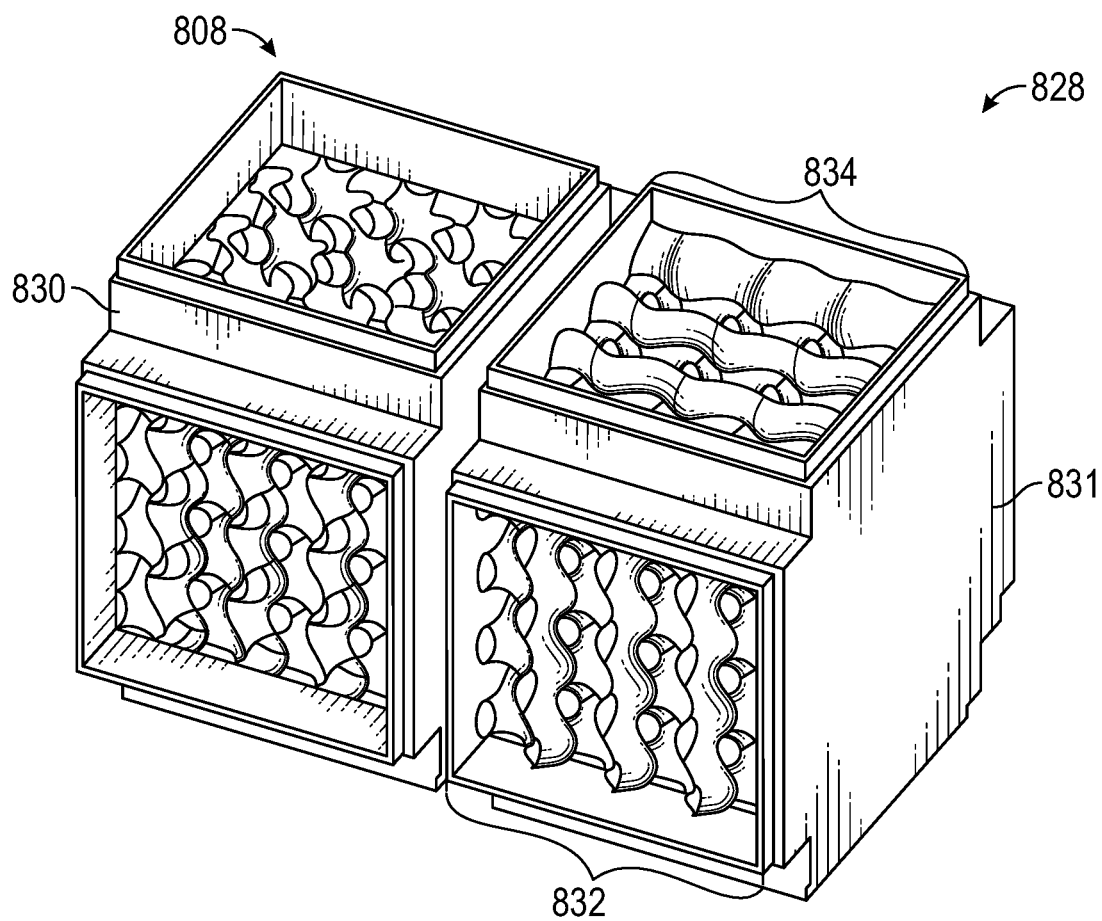
FIG. 8 is an isometric view of the MBCs shown in FIG. 7, integrated into respective frames in a cross flow configuration in accordance with various embodiments.

FIG. 8 is an isometric view of the MBCs shown in FIG. 7, integrated into respective frames in a cross flow configuration in accordance with various embodiments. More particularly, a finless MBC 808 is shown enclosed within a frame 830, and a finned MBC 828 is shown enclosed within a frame 831. In the illustrated embodiment, the frame 831 includes a first fluid inlet portion 832 and a second fluid inlet portion 834. Corresponding first and second fluid outlet portions are hidden from view in FIG. 8.

With momentary reference to FIGS. 6 and 8, a first inlet manifold 608 may be connected to the first fluid inlet portion 832, and a second inlet manifold 604 may be connected to the second fluid inlet portion 834. As discussed in greater detail below in connection with FIGS. 13 and 15, the inlet and discharge manifolds may be configured to mate with corresponding core fin structures to provide a contiguous fluid path from the inlet, through each respective labyrinth, and out of the core.

Figure 9:
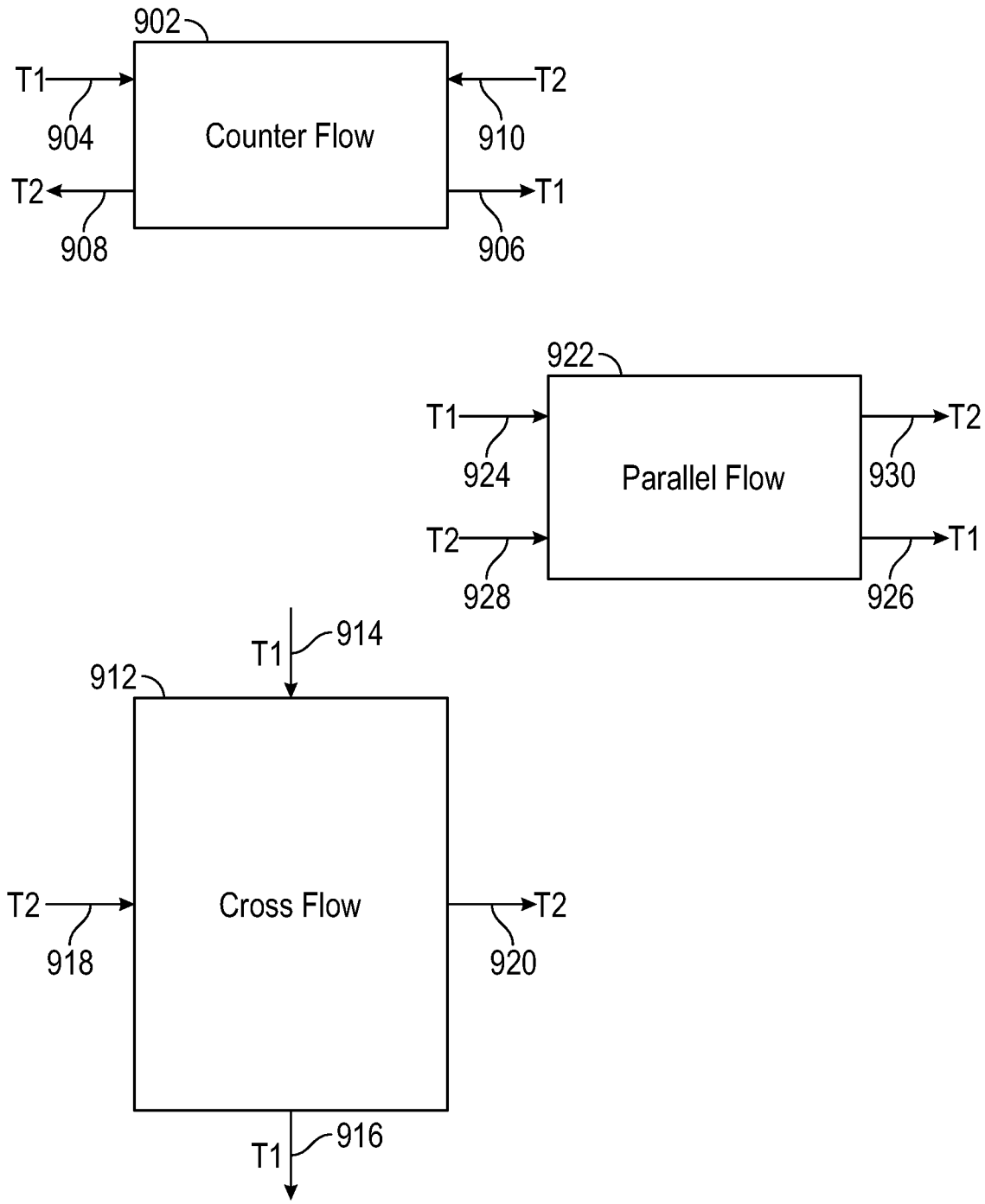
FIG. 9 depicts respective schematic diagrams of exemplary counter flow, cross flow, and parallel flow heat exchanger configurations in accordance with various embodiments.

FIG. 9 illustrates respective schematic diagrams for exemplary counter flow, cross flow, and parallel flow heat exchanger configurations in accordance with various embodiments. More particularly, an elongated core 902 depicts a counter flow configuration and includes a hot fluid input port 904, a hot fluid output port 906, a cold fluid input port 910, and a cold fluid output port 908.

With continued reference to FIG. 9, a cross flow core 912 includes a hot fluid input port 914, a hot fluid output port 916, a cold fluid input port 918, and a cold fluid output port 920. A parallel flow core 922 includes a hot fluid input port 924, a hot fluid output port 926, a cold fluid input port 928, and a cold fluid output port 930. Those skilled in the art will appreciate that the schematic forms shown in FIG. 9 are merely exemplary, and that the cores may exhibit any suitable regular or irregular cross section, shape, and contiguous extent.

Figure 10:
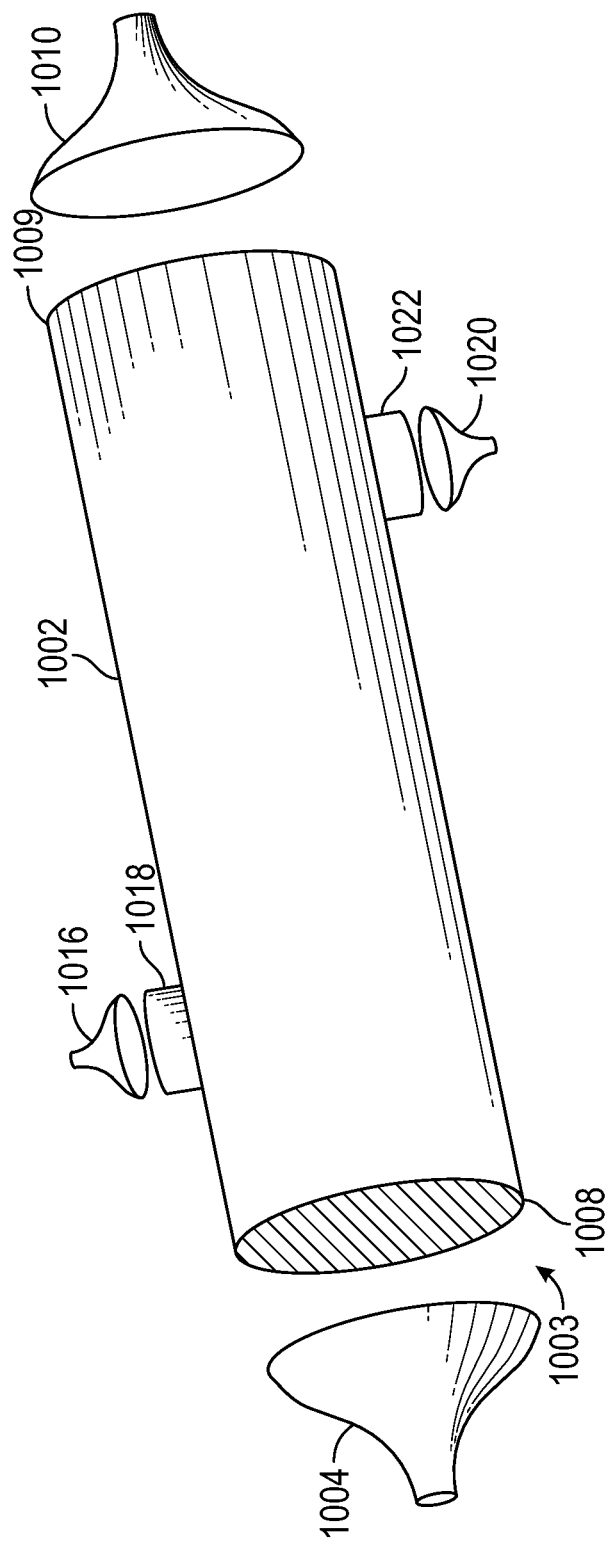
FIG. 10 is a perspective exploded view of an exemplary cylindrical housing for an MBC structure, illustrating a hybrid cross/counter flow arrangement including associated manifolds in accordance with various embodiments.

FIG. 10 depicts an exemplary heat exchange assembly moo including a cylindrical housing 1002 for enclosing an MBC core 1003, a first fluid inlet manifold 1004 configured for attachment to a first fluid inlet port 1008 associated with the housing 1002, a first fluid outlet manifold 1010 configured for attachment to a first fluid discharge port 1009 associated with the housing, a second fluid inlet manifold 1016 configured for attachment to a second fluid inlet port 1018 associated with the housing, and a second fluid outlet manifold 1020 configured for attachment to a second fluid discharge port 1022 associated with the housing. Finning structures (not shown) for selectively directing fluid into and, if desired, out of a particular labyrinth may be incorporated into or otherwise attached to that portion of the core which interfaces with a manifold, the manifold itself, or both.

Those skilled in the art will appreciate that significant cost, performance, and manufacturing efficiencies may be obtained to the extent the manifolds, housing, cowling, and/or fins can be integrated with the core and manufactured as a single assembly. In this regard, AM techniques (sometimes referred to as 3D printing) typically employ a removable structure for supporting "overhangs" during manufacture; however, if these structures can be designed with zero or near zero mean curvature (e.g., substantially sinusoidal), they can be printed without the need for removable supports. That being said, removable support structures are less problematic when used in conjunction with manifolds and housing structures which are external and, hence, more easily accessible than internal support structures.

Figure 11:
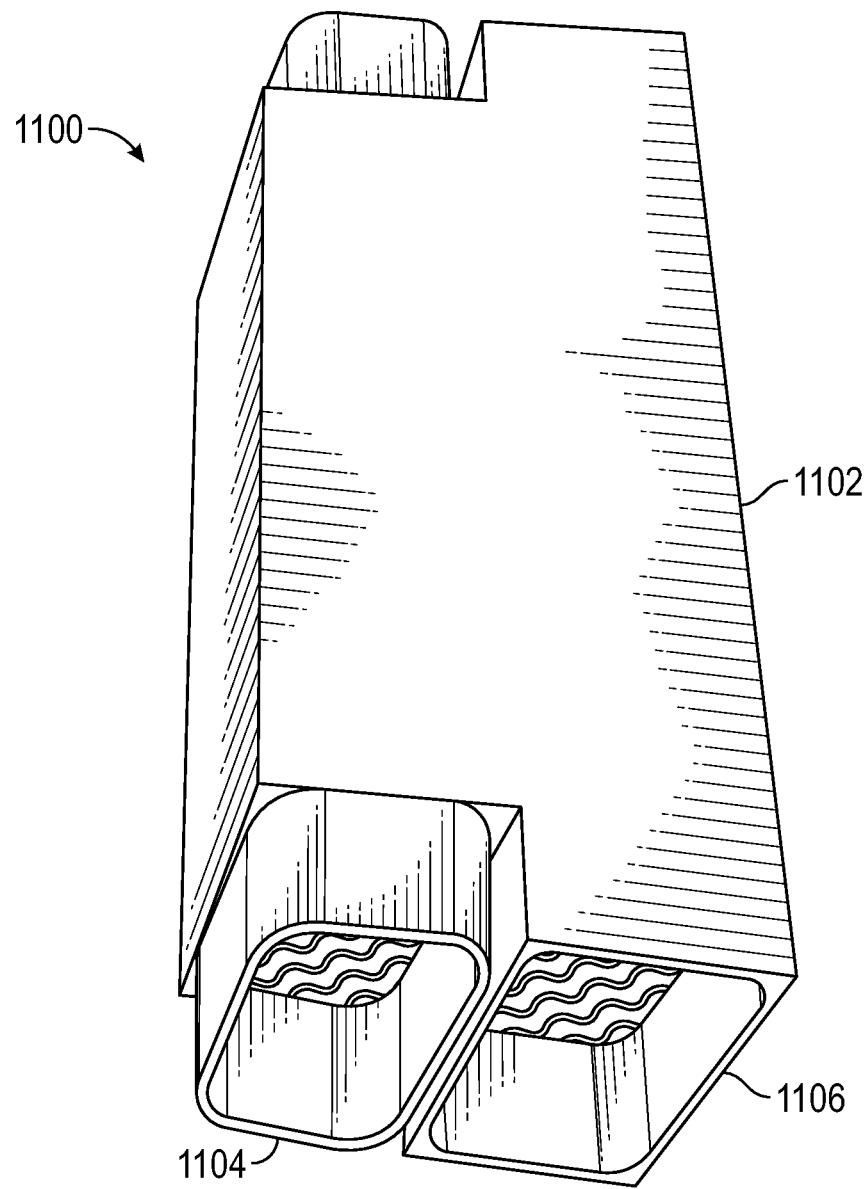
FIG. 11 is a perspective view of an exemplary rectangular housing for an MBC structure, illustrating a hybrid parallel/counter flow arrangement depicting integral overhanging manifolds in accordance with various embodiments.

Referring now to FIG. 11, an exemplary rectangular housing MBC assembly 1100 includes an internal core enclosed within a housing 1102, with integral manifolds 1104 and 1106 for directing fluid into (or out of) corresponding labyrinths. In the illustrated embodiment, the manifolds are substantially rectilinear and may require removable support structures to facilitate fabrication using additive manufacturing techniques. Alternatively, the manifolds may be manufactured using AM processes without the use of removable support structures by integrating support structures into to the assembly including portions of the core, frame, manifold, and/or manifold which provide intrinsic support during manufacture.

One of the advantages of a periodic unit cell design is that the core is self-supporting in any orientation, which facilitates fabrication via additive manufacturing techniques. A typical core designed in accordance with the principles discussed herein comprises an exterior surface characterized by a sinusoidal component. By incorporating a mating sinusoid into the interior wall of the housing to match the sinusoid of the core, the combination can be printed as a single integrated core/housing structure. The inside surface of the housing, where it mates with the core, will have fins adapted to close off one of the labyrinths and isolate it from the other labyrinth, leaving the labyrinth that is not closed off by the fins bounded by the inside surface of the housing.

Figure 12:
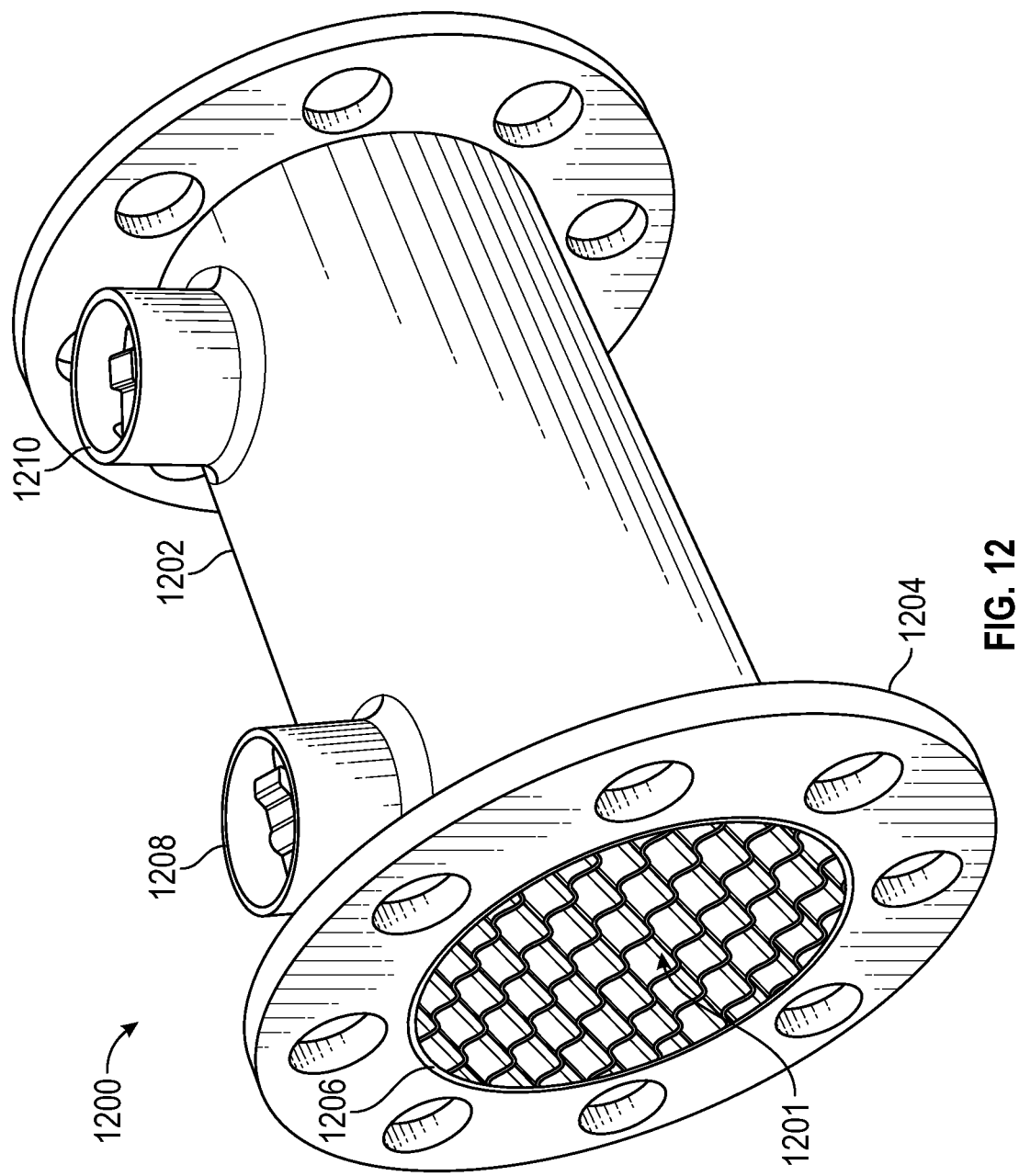
FIG. 12 is a perspective view of an exemplary cylindrical housing and frame structure including an integral (unitary) MBC for use as an in-line oil cooler in accordance with various embodiments.

More particularly, FIG. 12 is a perspective view of an exemplary in-line oil cooler assembly 1200 comprising a single integrated structure including an MBC 1201, a cylindrical housing 1202, a frame 1204, a first channel inlet port 1206, a first channel discharge port (not visible), a second channel inlet port 1208, and a second channel discharge port 1210.

Figure 13:
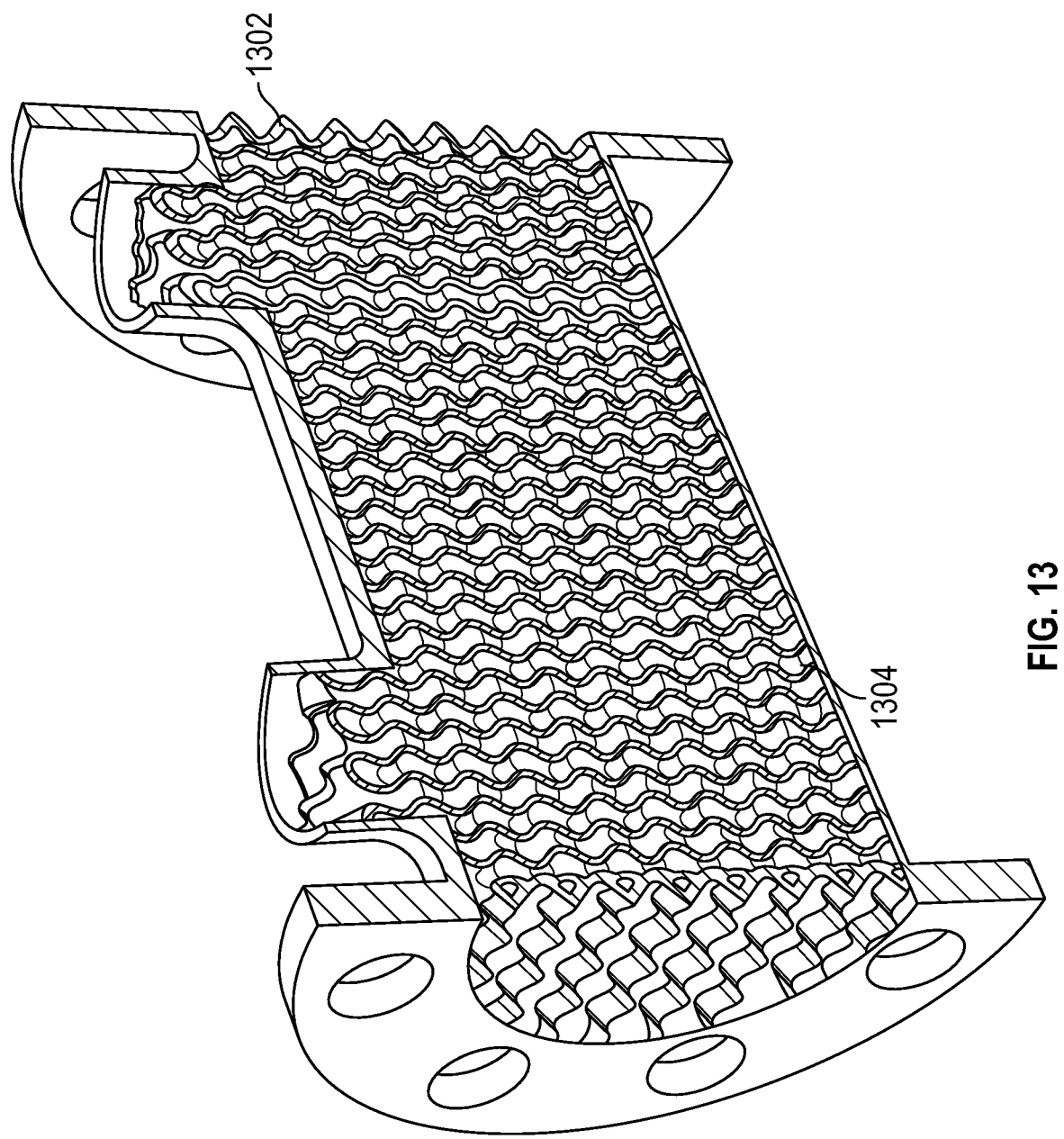
FIG. 13 is a cross-section cut-away view of the structure shown in FIG. 12 in accordance with various embodiments.

FIG. 13 is a cross-section view of the structure shown in FIG. 12, with a portion cut-away to reveal finning 1302 and boundary structures 1304 (e.g., ribs) which connect the internal wall of the housing to the core, to thereby facilitate manufacture of the entire assembly via AM as an integral assembly.

Applications contemplated by the present invention include exhaust gas recovery systems and other devices where the fluid may include particulates, for which antifouling features may be incorporated into and/or surrounding the core design. In this context, fouling refers to the presence of particulates which tend to build up on the inside surface of the fluid flow channel, reducing the effective cross-sectional area through which the gas passes, with a corresponding reduction in performance. Accumulated particulates on the heat transfer surface constrict fluid flow and increase the thermal resistance between the fluid and the wall.

In accordance with one aspect of the present invention, a core may employ non-homogeneous unit cells, for example, dense cells (smaller cross-section) in one region (e.g., the center of a cross-sectional core area), and more course cells (larger cross-section) near the perimeter. By introducing a centrifuge (e.g., in the form of guide vanes) at the inlet, the larger particles may be directed to the perimeter, while the smaller particles pass through the core closer to the longitudinal core axis. As a result of passing the larger particulates through a larger cross-section, the flow path is less likely to plug up with particulates, reducing required maintenance and extending the life cycle of the heat exchanger. In this way, the core effectively functions as a bypass filter. In an embodiment, a static mixer—which may be integral with the core—may be used to remix the high and low density portions, yielding a thermally homogeneous output flow.

Figure 14:
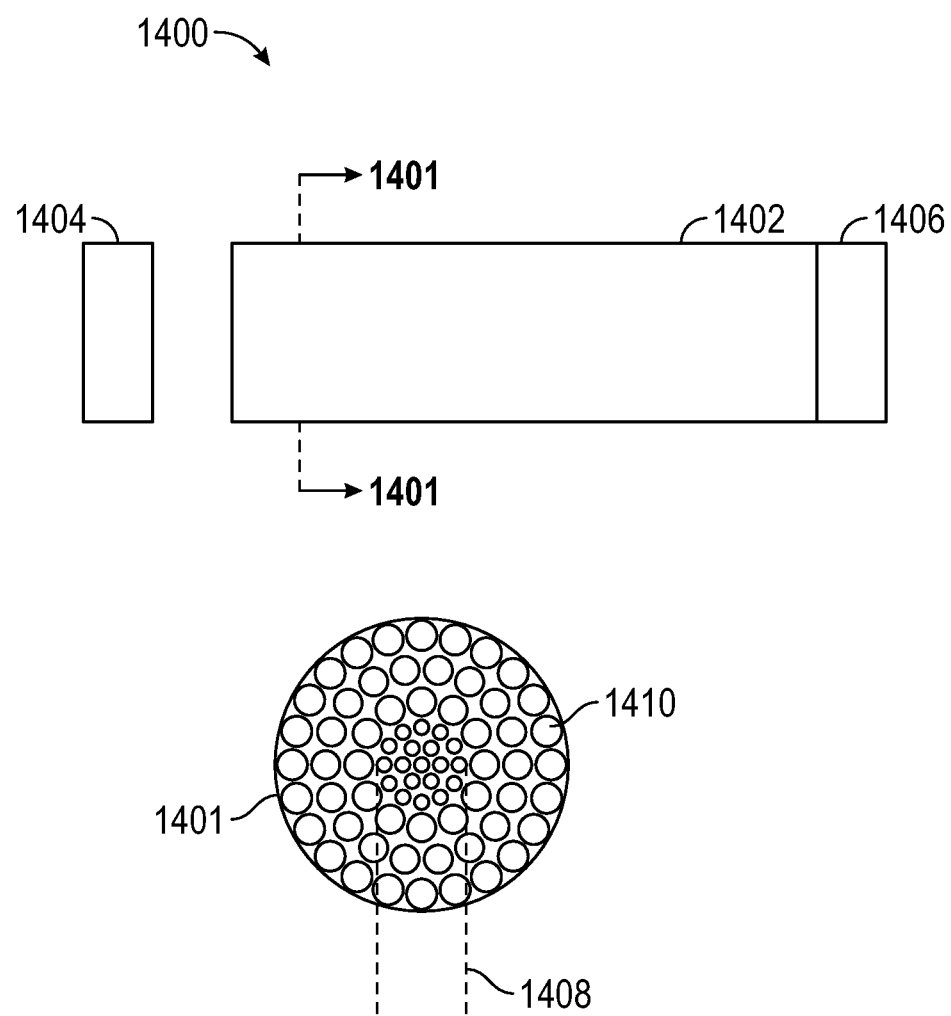
FIG. 14 is a schematic diagram of an exemplary bypass core arrangement in accordance with various embodiments.

FIG. 14 depicts an exemplary heat exchanger assembly 1400 including a bypass core 1401 enclosed within a housing 1402, a centrifuge 1404 disposed proximate an input to the core, and a remixer 1406 proximate a core output. In particular, the core 1401 exhibits smaller diameter cells 1408 near the linear axis (flow axis) of the core, and larger diameter cells 1410 near the perimeter of the core cross-section (remote from the flow axis). That is, the group of cells located near the core housing have a greater cross-sectional area than the group of cells located near the flow axis. Varying the unit cell diameter and, hence, the channel cross section may be achieved by manipulating the lattice parameter which characterizes the unit cell.

Figure 15:
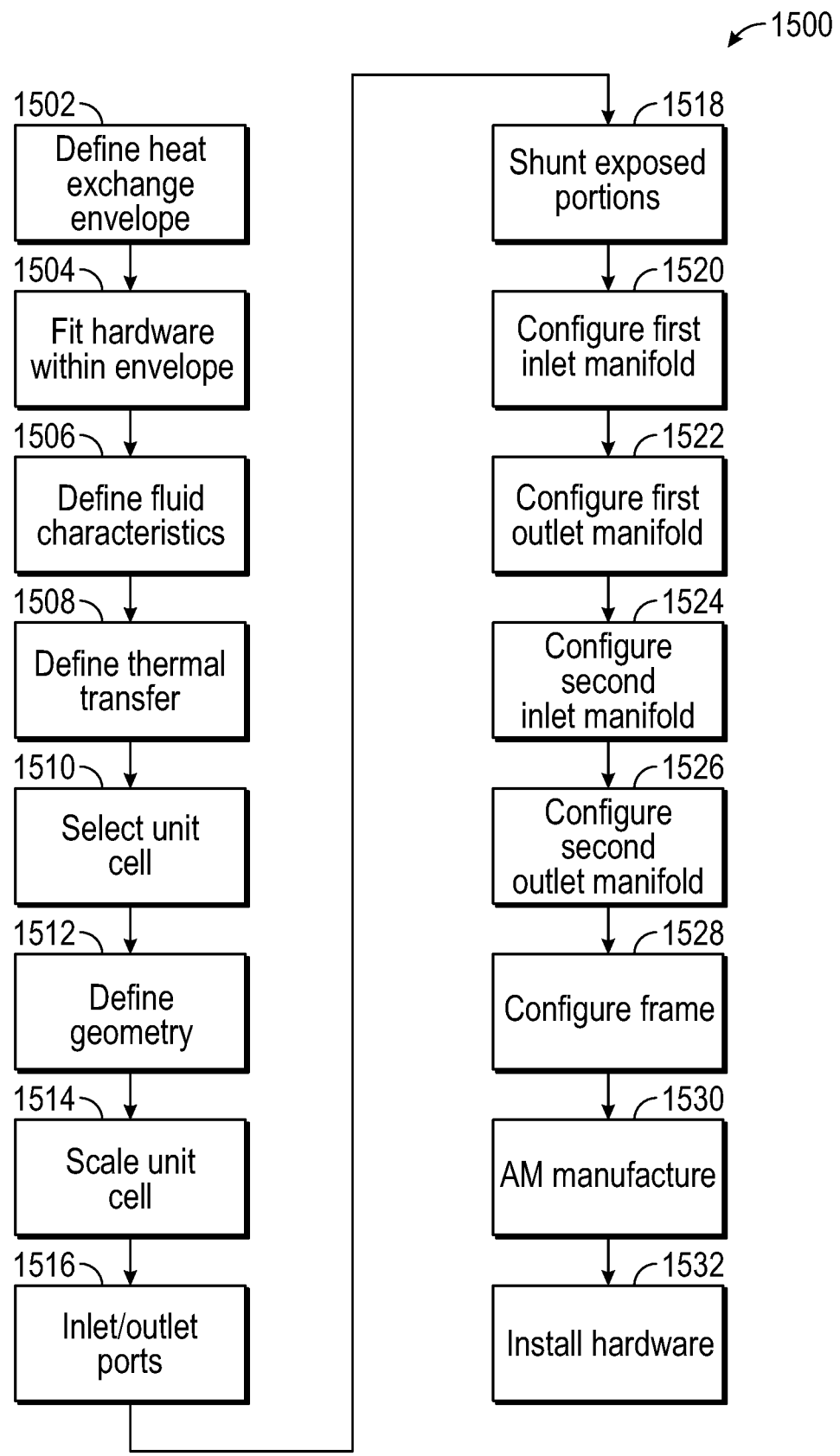
FIG. 15 is a schematic process diagram of an exemplary method for manufacturing an MBC assembly in accordance with various embodiments.

FIG. 15 is a schematic process diagram of an exemplary method 1500 for manufacturing an MBC assembly in accordance with various embodiments of the invention. More particularly, the method 1500 may include all or any sub-set of the following: i) defining (Task 1502) a total heat exchange envelope within an operating environment which includes first and second fluid inlet sources and first and second fluid discharge ports; ii) defining (Task 1504) a core portion, a frame portion, and/or a manifold portion to fit within the heat exchange operating envelope defined by physical boundary conditions; iii) defining (Task 1506) first and second fluid characteristics (e.g., respective specific heats); iv) defining (Task 1508) thermal transfer requirements, for example, expressed in terms of kilowatts; v) selecting (Task 1510) a unit cell configuration; vi) defining (Task 1512) geometric parameters for the unit cell (e.g., lattice constant, wall thickness, and orientation) based on the fluid characteristics and the thermal transfer requirements; vii) scaling (Task 1514) the unit cell to optimally fill the core portion of the heat exchange envelope, resulting in at least first and second intertwined labyrinths; viii) defining (Task 1516) inlet and outlet ports for each of the first and second labyrinths, respectively; ix) shunting (blocking off) (Task 1518) the exposed portions of the first and second labyrinths which are not designated as inlet or outlet ports; x) configuring (Task 1520) a first inlet manifold for connecting the inlet port of the first labyrinth to the first fluid inlet source; xi) configuring (Task 1522) a first outlet manifold for connecting the outlet port of the first labyrinth to the first fluid discharge port; xii) configuring (Task 1524) a second inlet manifold for connecting the inlet port of the second labyrinth to the second fluid inlet source; xiii) configuring (Task 1526) a second outlet manifold for connecting the outlet port of the second labyrinth to the second fluid discharge source; xiv) configuring (Task 1528) a support frame for mounting the core within its operating environment and configuring interface features for directing fluid flow between the manifolds and the core (e.g., to reduce form drag); xv) fabricating (Task 1530) at least the core portion (and optionally the frame and/or manifolds as well) using additive manufacturing techniques; and xvi) installing (Task 1532) the core, the frame, and the manifolds within the operating environment.

Those skilled in the art will appreciate that each fluid has its own thermal resistance, dependent on intrinsic values and flow conditions. To compensate for a large difference between respective thermal resistances of the fluids, the respective mass flow rates and/or hydraulic diameters of the two (or more) fluid channels may be adjusted to maximize or otherwise optimize thermal transfer. Moreover, fins and other internal structures may be included in one or both labyrinths (flow channels) to increase the heat exchange surface area (through the addition of secondary surfaces) and/or flow characteristics (e.g., laminar vs turbulent flow) within one or both flow paths.

Figure 16:
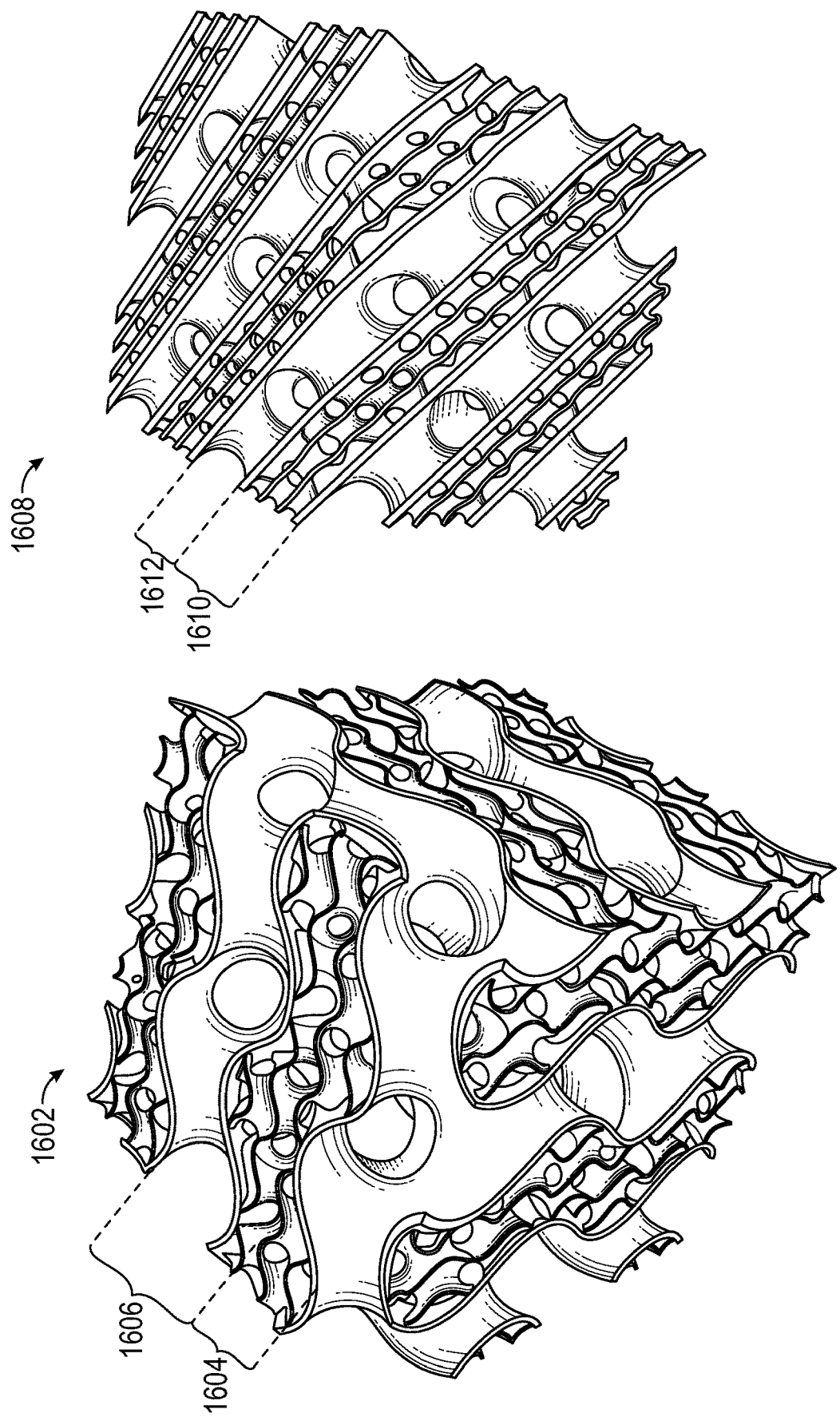
FIG. 16 depicts perspective views of two alternative configurations of three-dimensional MB core structures, each including respective secondary surfaces in accordance with various embodiments.

FIG. 16 illustrates two alternative configurations of three-dimensional MB core structures, each including respective secondary surfaces. In particular, a first MBC structure 1602 includes a flow path 1604 which includes internal secondary surface structures and a flow path 1606 without secondary surface structures. A second MBC structure 1608 includes a flow path 1610 which includes internal secondary surface structures and a flow path 1612 without secondary surface structures. In each embodiment, the macroscopic core geometry may be identical to the secondary surface geometry, except that the secondary surface geometry is scaled down to fit within the labyrinth bounded by the larger unit cell. For example, the larger core may be formed by repeating a 10 mm unit cell and the secondary surface may formed by repeating a 3 mm unit cell.

Secondary surfaces are particularly useful in heat exchanger applications (e.g., an intercooler on a diesel engine) involving a gas in one labyrinth channel and a liquid in the other channel. Heat exchange efficiency may be enhanced with balanced thermal resistances, that is, where the resistance to heat transfer from the gas into the wall is approximately equal to the thermal resistance to heat transfer from the liquid to the wall. Since the properties of gases and liquids are often quite different, the gas channel typically requires a greater surface area than the liquid channel. The use of secondary surface in the gas channel provides the extra surface area to balance the thermal resistances. The amount of extra gas-side surface area may be determined using the thermal resistance of the liquid side. The amount of secondary surface is controlled by the secondary surface unit cell size or, more particularly, by the ratio of the smaller unit cell size to the larger MBC cell size.

The benefit of using a scaled down unit cell is that the entire structure still maintains the 'self-supporting' characteristic in additive processes. That is, using conventional secondary surface configurations (i.e. fins or rods) in one labyrinth tends to create overhangs or other structures not easily fabricated using AM techniques.

Figure 17:
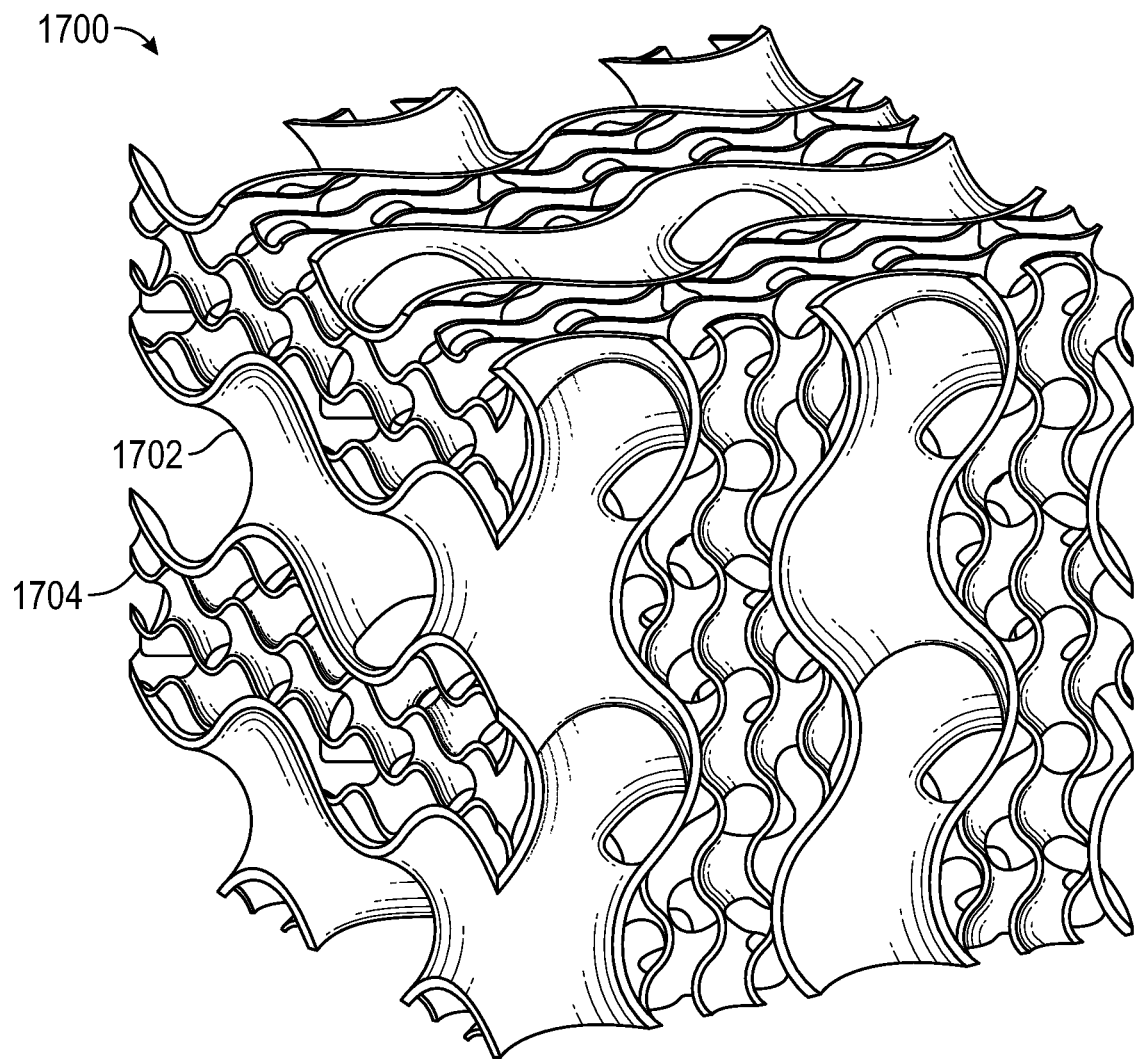
FIG. 17 is a detailed view of a first embodiment of secondary surfaces in accordance with various embodiments.

FIG. 17 is a perspective view of an MBC structure 1700 including a macroscopic repeating cell structure 1702 and a secondary surface repeating cell structure 1704 inside one labyrinth channel.

Figure 18:
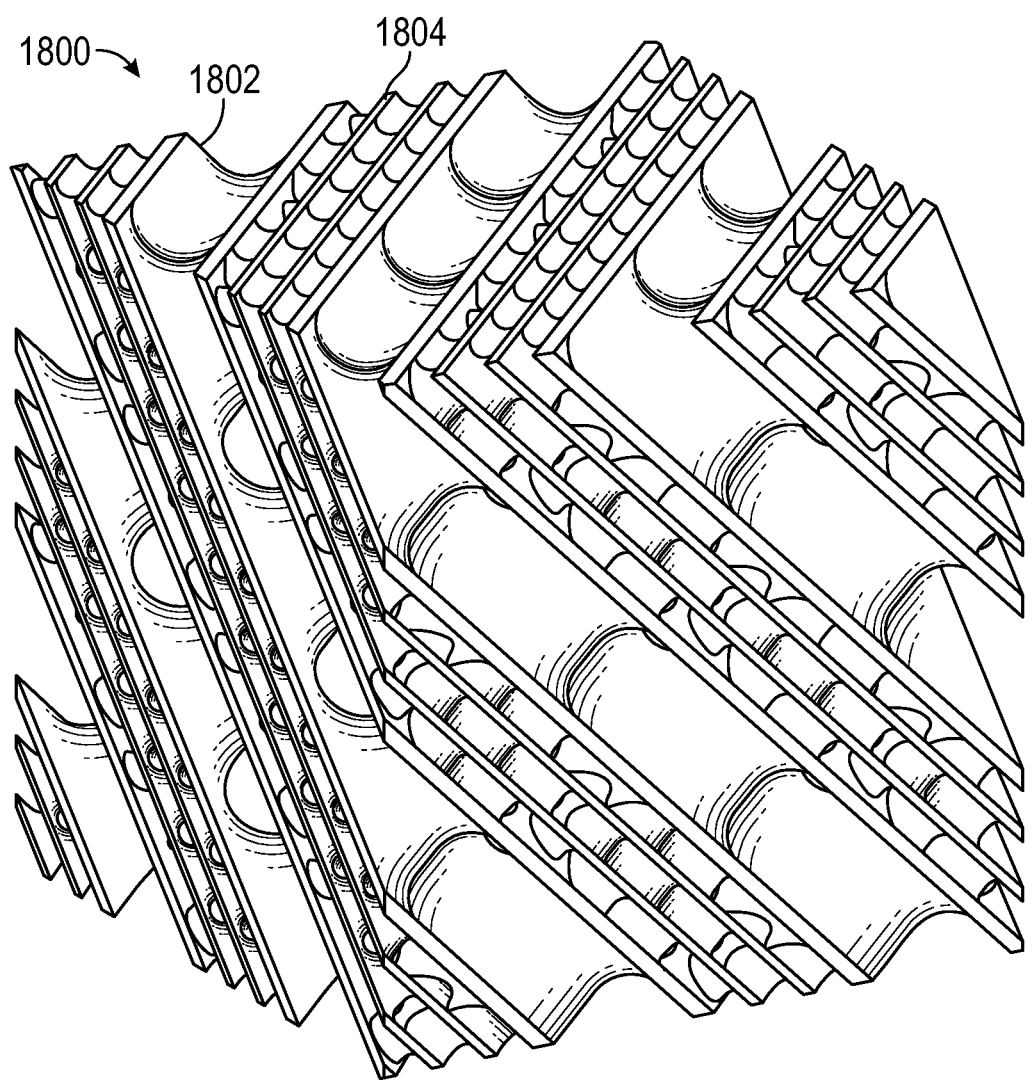
FIG. 18 is a detailed view of a second embodiment of secondary surfaces in accordance with various embodiments.

FIG. 18 is a perspective view of an MBC structure 1800 including a macroscopic repeating cell structure 1802 and a secondary surface repeating cell structure 1804 inside one labyrinth channel.

The present invention further facilitates the configuration and placement of inlet and outlet manifolds at the core boundary. More particularly, since every point on the inside surface of a particular labyrinth is in fluidic communication with every other point on the inside surface of the same labyrinth, the input and outlet manifolds may be optimally positioned at any point or points on the labyrinth, enhancing conformal accommodation of the available design envelope (referred to herein as the "bounding box").

In accordance with further aspects of the present invention, monolithic bi-continuous core heat exchanger reactors of the type described herein may also be used for chemical process intensification. In particular, exothermic or endothermic reactions may be cooled or heated (respectively) to better control the temperature of the reaction, eliminate thermal run away, and to allow for continuous production (flow chemistry). This may be achieved by combining (mixing) two or more reacting fluids into one labyrinth, and introducing a cooling or heating fluid into the other labyrinth.

For example, a flow through heat exchanger reactor may employ a control fluid to control the reaction rate by controlling the thermal environment, as opposed to presently known batch reactors which typically use solvents to control the reaction rate.

The following chemical processes may benefit from a heat exchanger reactor constructed in accordance with the present invention: Nitration, Azo coupling, Halogenation, Hydrogenation, Oxidation, Sulfonation, Amination, Esterification, and Alkylation.

Various embodiments of the present invention may be implemented as heat exchangers in the following non-limiting contexts, applications, and industry sectors:

Aerospace: Recuperators for Turbines/Microturbines, Environmental Control Units, Oil/Fuel Heaters;

Automotive: Exhaust Gas Recovery, Radiators, A/C Systems;

Marine: Seawater isolation exchanger, jacket fresh water cooling, lube oil cooling, camshaft lube;

Petroleum/Chemical Processing: Refinery (Brine Cooling, Crude Oil/Water Interchanger, Treated/Untreated Crude Interchanger), MTBE (Product Heating/Cooling/Interchanging, Jacket Water Cooling/Condensing), Alkyolotion (Heating/Cooling of Corrosive Fluids; Isobutene Condenser & Reactor Interchanger), Oil & Gas (Sea Water Coolers; Crude Oil Heat Treatment), Dehydration/Desolving (Crude Oil Cooling/Interchanging; Crude Oil/Water Interchanger), Desulphurization (Lean/rich Fluid Interchanger & Cooler; Acid Gas Condenser);

Hydrocarbon Processing: Preheating, Cooling Water or Product, Heat Recovery, Reactor Feed Heater/Interchanger of various products (i.e. methanol, propylene oxide, ethylene glycol, ethylene oxide, ethylene-propylene, formaldehyde);

Polymers: Heating/cooling, condensing, interchanging of solvents, reactors, products such as acrylinc fibers, nylon, polyester, polyethelene, polyol, polypropylene, polyurethane, viscose;

Energy: CHP Applications (Combined Heat & Power), Energy Recovery/Storage, Solar Thermal Energy Applications, Sterling Cycle Systems, Hydrogen Storage;

Nuclear;

Pulp & Paper: Blowdown liquor coolers, caustic soda coolers, black liquor heating, boiler blowdown heat recovery;

Food & Beverage Processing: Pasteurization (Milk, Beer, Syrup, Juice, Nectar, Concentrates), Cultured Treatment (Milk, Ice Cream, Cheese), Boiling/Cooling (Wort, Beer);

Pharmaceuticals: Product, Solvents, Reactor heating/cooling, condensers & interchangers;

Biochemical;

General Processes: Condensers, Heaters, Coolers, Chillers, Liquid Vapor Phase Change Exchangers, Liquid/Liquid Cooling, Liquid/Gas Cooling, Gas/Gas Cooling;

Heavy Industry: Hot water production, Extraction of Ammonia, Hydrogen Sulfide, Gas Cooling, Heat Exchange on Utility Fluids, Fuel Heaters, Kettle (Evaporator-Condenser, Heat transfer oil, superheated water), Purification Plat Exchangers, Cellulose or timber driers, Watercooling Diesel Engines, Waste Incinerators;

Optics: X-ray Tubes, Lasers, Power Supplies, Desalination, Mining, HVAC, textiles.

Those skilled in the art will appreciate that, in the context of the present invention, various stand-alone parts and/or integrated assemblies may be fabricated by melting powdered metal layer by layer, using a laser or an electron beam as the thermal source. Several powder bed fusion additive manufacturing methods are available to produce a wide range of materials, including alloys of titanium, steel, aluminum, and nickel based superalloys.

| Variable | Range | Comments |
| --- | --- | --- |
| Materials | 316L Stainless Steel, Ti—6Al—4V, AlSi10Mg | No substantial difference in manufacturability for material changes with equivalent configurations |
| Topologies | Gyroid, Schwarz Diamond, Schwarz W, Neovius' Surface | Gyroid & Schwarz Diamond demonstrated the largest manufacturable range |
| Minimum Lattice Constant | 2-9 mm | Powder was removed from all cells within this range; Broken struts were seen for low lattice constants with low volume fractions |
| Minimum Volume Fraction | 5-20% | Volume fraction must increase as lattice constant increase to compensate for strut sagging |
| Cell Orientation | 0-180 | All orientations were manufacturable |
| AM System | SLM, DMLS | Both systems demonstrated similar manufacturability performance |

A heat exchanger is thus provided which includes: a core comprising a single piece continuous boundary having a first surface defining a first labyrinth, and an opposing second surface defining a second labyrinth; a first inlet manifold connected to the first labyrinth and configured to supply a first fluid to the first labyrinth; and a second inlet manifold connected to the second labyrinth and configured to supply a second fluid to the second labyrinth; wherein the core comprises a plurality of identical three dimensional unit cell structures replicated in three orthogonal spatial dimensions.

In an embodiment, the unit cell structure exhibits substantially zero mean Gaussian curvature.

In an embodiment, the core exhibits substantially zero mean Gaussian curvature.

In an embodiment, the core is substantially devoid of braze and weld joints.

In an embodiment, the unit cell structure is characterized by a lattice parameter and a boundary thickness; and the lattice parameter and boundary thickness are configurable to define respective hydraulic diameters and flow volumes for the first and second labyrinths.

In an embodiment, the heat exchanger further includes: a first discharge manifold connected to the first labyrinth and configured to exhaust the first fluid from the first labyrinth; and a second discharge manifold connected to the second labyrinth and configured to exhaust the second fluid to the second labyrinth.

In an embodiment, the first inlet manifold defines a first inlet interface with the first labyrinth, and the second inlet manifold defines a second inlet interface with the second labyrinth; the first inlet interface comprises a first inlet finning structure configured to selectively shunt the first fluid from the second labyrinth and selectively direct the first fluid into the first labyrinth; and the second inlet interface comprises a second inlet finning structure configured to selectively shunt the second fluid from the first labyrinth and selectively direct the second fluid into the second labyrinth.

In an embodiment, the first discharge manifold defines a first discharge interface with the first labyrinth, and the second discharge manifold defines a second discharge interface with the second labyrinth; the first discharge interface comprises a first discharge finning structure configured to close off the second labyrinth and selectively receive the first fluid from the first labyrinth; and the second discharge interface comprises a second discharge finning structure configured to close off the first labyrinth and selectively receive the second fluid from the second labyrinth.

In an embodiment the core, the first inlet finning structure, and the second inlet finning structure together comprise an integral monolithic structure configured to be fabricated using additive manufacturing techniques.

In an embodiment the core, the first discharge finning structure, and the second discharge finning structure together comprise an integral monolithic structure configured to be fabricated using additive manufacturing techniques.

In an embodiment, the heat exchanger further includes a support frame enclosing the core, wherein the frame and the core together comprise an integral monolithic structure configured to be fabricated using additive manufacturing techniques.

In an embodiment, the first labyrinth comprises a first continuous flow channel, and the second labyrinth comprises a second continuous flow channel, the heat exchanger further comprising a plurality of secondary surfaces extending inwardly from at least one of the first and second channel walls and configured to increase the heat exchange surface area and to promote turbulent flow.

In an embodiment, the secondary surfaces and the core together comprise an integral monolithic structure configured to be fabricated using additive manufacturing techniques.

In an embodiment, the first labyrinth is hydraulically isolated from the second labyrinth.

In an embodiment, the first labyrinth is pneumatically isolated from the second labyrinth.

In an embodiment, the first labyrinth is intertwined with but does not intersect the second labyrinth within the core interior.

In an embodiment, the first labyrinth comprises a first group of cells having a first cross-sectional area, and a second group of cells having a second cross-sectional area greater than the first cross-sectional area; and the first group of cells are disposed proximate a flow axis, and the second group of cells are disposed remote from the flow axis proximate an internal wall of the first labyrinth.

In an embodiment, the first fluid comprises a first reactant and the second fluid comprises a thermal control fluid; and the first inlet manifold is configured to simultaneously supply the first reactant and a second reactant to the first labyrinth.

In an embodiment, the heat exchanger further includes a thermocouple 711 configured to monitor the temperature within the first labyrinth and to control the flow rate of the thermal control fluid as a function of the monitored temperature.

A powder bed fusion additive manufacturing process is also provided for use in fabricating a heat exchanger core characterized by a single piece continuous boundary formed of identically replicated unit cells, the core having a first surface defining a first labyrinth and an opposing second surface defining a second labyrinth. The process involves:

melting a powdered metal layer, using one of a laser and an electron beam as a thermal source; and recursively melting additional layers to form the first and second labyrinths into a resultant structure exhibiting near zero mean curvature.

A computer program stored in a non-transitory medium is also provided which, when executed by a computer processor, performs the steps of: defining a lattice constant, a wall thickness, and an orientation for a unit cell based on the fluid characteristics and thermal transfer requirements for a heat exchanger; scaling the unit cell to yield respective first and second intertwined non-intersecting labyrinths; defining inlet and outlet ports on each of the first and second labyrinths, respectively; blocking off exposed portions of the first and second labyrinths which are not designated as inlet or outlet ports; configuring a first inlet manifold for connecting the inlet ports of the first labyrinth to the first fluid inlet source; configuring a support frame for mounting the core within an operating environment; and fabricating at least the core portion using additive manufacturing techniques.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A heat exchanger, comprising:
a core comprising a single piece continuous boundary having a first surface defining a first labyrinth, and an opposing second surface defining a second labyrinth;
a first inlet manifold connected to the first labyrinth and configured to supply a first fluid to the first labyrinth; and
a second inlet manifold connected to the second labyrinth and configured to supply a second fluid to the second labyrinth;
wherein:
the core comprises a plurality of three dimensional unit cell structures replicated in three orthogonal spatial dimensions;
the first inlet manifold defines a first inlet interface with the first labyrinth, and the second inlet manifold defines a second inlet interface with the second labyrinth;
the first inlet interface comprises a first inlet finning structure configured to selectively shunt the first fluid from the second labyrinth and selectively direct the first fluid into the first labyrinth; and
the second inlet interface comprises a second inlet finning structure configured to selectively shunt the second fluid from the first labyrinth and selectively direct the second fluid into the second labyrinth.

2. The heat exchanger of claim 1, wherein:
the first discharge manifold defines a first discharge interface with the first labyrinth, and the second discharge manifold defines a second discharge interface with the second labyrinth;
the first discharge interface comprises a first discharge finning structure configured to close off the second labyrinth and selectively receive the first fluid from the first labyrinth; and
the second discharge interface comprises a second discharge finning structure configured to close off the first labyrinth and selectively receive the second fluid from the second labyrinth.

3. The heat exchanger of claim 1, wherein the core, the first inlet finning structure, and the second inlet finning structure together comprise an integral monolithic structure configured to be fabricated using additive manufacturing techniques.

4. The heat exchanger of claim 2, wherein the core, the first discharge finning structure, and the second discharge finning structure together comprise an integral monolithic structure configured to be fabricated using additive manufacturing techniques.

5. The heat exchanger of claim 1, further comprising a support frame enclosing the core, wherein the frame and the core together comprise an integral monolithic structure configured to be fabricated using additive manufacturing techniques.

6. The heat exchanger of claim 1, wherein the first labyrinth comprises a first continuous flow channel, and the second labyrinth comprises a second continuous flow channel, the heat exchanger further comprising a plurality of secondary surfaces extending inwardly from at least one of the first and second channel walls and configured to increase the heat exchange surface area and to promote turbulent flow.

7. The heat exchanger of claim 6, wherein the secondary surfaces and the core together comprise an integral monolithic structure configured to be fabricated using additive manufacturing techniques.

8. A heat exchanger, comprising:
a core comprising a single piece continuous boundary having a first surface defining a first labyrinth, and an opposing second surface defining a second labyrinth;
a first inlet manifold connected to the first labyrinth and configured to supply a first fluid to the first labyrinth; and
a second inlet manifold connected to the second labyrinth and configured to supply a second fluid to the second labyrinth;
wherein:
the core comprises a plurality of three dimensional unit cell structures replicated in three orthogonal spatial dimensions
the first labyrinth comprises a first group of cells having a first cross-sectional area, and a second group of cells having a second cross-sectional area greater than the first cross-sectional area; and
the first group of cells are disposed proximate to the flow axis, and the second group of cells are disposed remote from the flow axis proximate to an external wall of the first labyrinth.

* * * * *